US006311056B1

(12) United States Patent
Sandidge

(10) Patent No.: US 6,311,056 B1
(45) Date of Patent: Oct. 30, 2001

(54) METHOD AND SYSTEM FOR EXPANDING THE DATA CAPACITY OF A CELLULAR NETWORK CONTROL CHANNEL

(75) Inventor: Jere T. Sandidge, Stone Mountain, GA (US)

(73) Assignee: Cellemetry LLc, Atlanta, GA (US)

( * ) Notice: Subject to any disclaimer, the term of this patent is extended or adjusted under 35 U.S.C. 154(b) by 0 days.

(21) Appl. No.: 09/082,694

(22) Filed: May 21, 1998

(51) Int. Cl.$^7$ ...................................................... H04M 3/42
(52) U.S. Cl. ............................ 455/414; 455/412; 455/426
(58) Field of Search ..................................... 455/426, 414, 455/412, 557, 404, 556, 552, 458

(56) References Cited

U.S. PATENT DOCUMENTS

| 3,973,200 | 8/1976 | Akerberg . |
| 4,172,969 | 10/1979 | Levine et al. . |
| 4,263,480 | 4/1981 | Levine . |
| 4,644,351 | 2/1987 | Zabarsky et al. . |
| 4,646,082 | 2/1987 | Engel et al. . |
| 4,750,197 | 6/1988 | Denekamp et al. . |
| 4,814,763 | 3/1989 | Nelson et al. . |

(List continued on next page.)

FOREIGN PATENT DOCUMENTS

| WO 95/24791 | 9/1995 | (EP) . |
| WO 97/36435 | 10/1997 | (EP) . |

OTHER PUBLICATIONS

TIA/EIA Interim Standard, Cellular Readiotelecommunications Intersystem Operations: Signaling Protocols, IS–41.5–C, Feb. 1996.*

European Telecommunication Standard—Draft pr ETS 300 537, "European Digital Cellular Telecommunications System (Phase 2); Technical Realization of Short Message Service Call Broadcast (SMSCB)", European Telecommunications Standards Institute, Oct. 1993.

European Telecommunication Standard—Draft pr ETS 300 536, "European Digital Cellular Telecommunications System (Phase 2); Technical Realization of the Short Message Service (SMS) Point to Point (PP)", European Telecommunications Standards Institute, Oct. 1993.

The GSM System for Mobile Communications, Michel Mouly and Marie–Bernadette Pautet ISBN: 2–9507190–0–7, ©1992; pp. 56–59.

"Mobile Cellular Telecommunications Systems", William C.Y. Lee, pp. 74–80, 1989.

TIA/EIA 1s54–B Standard.

TIA/EIA 1s41.5–C Standard.

Primary Examiner—Dwayne Bost
Assistant Examiner—Joy K. Contee
(74) Attorney, Agent, or Firm—Kilpatrick Stockton

(57) ABSTRACT

Expanding the data carrying capacity of a forward control channel of a cellular mobile radiotelephone (CMR) system. By utilizing data fields that would otherwise be unused in a conventional data message system, an operation identifier can be transmitted to a data reporting device. The forward control channel carries control messages which are capable of causing cellular devices to perform certain communications functions. An Order Code data field within the control message defines the functionality of the message. By utilizing the Order Code data fields to invoke the message waiting functionality of the control message, and replacing the message waiting data with an operation identifier, the data carrying capacity of the forward control channel is increased. An external device connected to the data reporting device can be caused to perform an operation defined by the operation identifier. The operation identifier can define an operation specified from a list of available operations. For cellular communications devices that are responsive to more than one mobile identification number (MIN), the range of operations that can be processed by a control unit is greatly expanded.

27 Claims, 6 Drawing Sheets

U.S. PATENT DOCUMENTS

| | | |
|---|---|---|
| 4,823,123 | 4/1989 | Siwiak . |
| 4,825,193 | 4/1989 | Siwiak et al. . |
| 4,825,457 | 4/1989 | Lebowitz . |
| 4,837,800 | 6/1989 | Freeburg et al. . |
| 4,866,445 * | 9/1989 | Valero et al. ........................ 341/106 |
| 4,868,560 | 9/1989 | Oliwa et al. . |
| 4,875,038 | 10/1989 | Siwiak et al. . |
| 4,882,579 | 11/1989 | Siwiak . |
| 4,891,637 | 1/1990 | Siwiak et al. . |
| 4,905,234 | 2/1990 | Childress et al. . |
| 4,914,651 | 4/1990 | Lusignan . |
| 4,928,096 | 5/1990 | Leonardo et al. . |
| 4,940,963 | 7/1990 | Gutman et al. . |
| 4,993,059 | 2/1991 | Smith et al. . |
| 5,005,014 | 4/1991 | Jasinski . |
| 5,010,584 | 4/1991 | Seki . |
| 5,031,204 | 7/1991 | McKernan . |
| 5,047,763 | 9/1991 | Kuznicki et al. . |
| 5,117,449 | 5/1992 | Metroka et al. . |
| 5,124,697 | 6/1992 | Moore . |
| 5,142,279 | 8/1992 | Jasinski et al. . |
| 5,148,473 | 9/1992 | Freeland et al. . |
| 5,153,582 | 10/1992 | Davis . |
| 5,153,903 | 10/1992 | Eastmond et al. . |
| 5,159,625 | 10/1992 | Zicker . |
| 5,162,790 | 11/1992 | Jasinski . |
| 5,175,758 | 12/1992 | Levanto et al. . |
| 5,210,787 | 5/1993 | Hayes et al. . |
| 5,218,367 | 6/1993 | Sheffer et al. . |
| 5,220,599 | 6/1993 | Sasano et al. ........................ 379/142 |
| 5,222,123 | 6/1993 | Brown et al. . |
| 5,239,294 | 8/1993 | Flanders et al. . |
| 5,239,678 | 8/1993 | Grube et al. . |
| 5,255,307 | 10/1993 | Mizikovsky . |
| 5,307,399 | 4/1994 | Dai et al. . |
| 5,307,509 | 4/1994 | Michalon et al. . |
| 5,341,410 | 8/1994 | Aron et al. . |
| 5,363,427 | 11/1994 | Ekstrom et al. . |
| 5,371,898 | 12/1994 | Grube et al. . |
| 5,382,970 | 1/1995 | Kiefl . |
| 5,396,537 | 3/1995 | Schwendeman . |
| 5,396,539 | 3/1995 | Slekys et al. . |
| 5,404,392 | 4/1995 | Miller et al. . |
| 5,454,027 | 9/1995 | Kennedy et al. . |
| 5,493,722 | 2/1996 | Gunn et al. . |
| 5,502,761 | 3/1996 | Duncan et al. . |
| 5,511,072 | 4/1996 | Delprat . |
| 5,511,110 | 4/1996 | Drucker . |
| 5,526,401 | 6/1996 | Roach, Jr. et al. . |
| 5,528,664 | 6/1996 | Slekys et al. . |
| 5,539,810 | 7/1996 | Kennedy, III et al. . |
| 5,544,223 | 8/1996 | Robbins et al. . |
| 5,544,225 | 8/1996 | Kennedy, III et al. . |
| 5,546,444 * | 8/1996 | Roach, Jr. et al. ................... 455/412 |
| 5,594,740 | 1/1997 | LaDue . |
| 5,596,573 | 1/1997 | Bertland . |
| 5,610,973 | 3/1997 | Comer . |
| 5,625,889 | 4/1997 | Chikkaswamy et al. . |
| 5,652,570 | 7/1997 | Lepkofker . |
| 5,680,551 * | 10/1997 | Martino, II ........................ 395/200 |
| 5,686,888 | 11/1997 | Welles, II et al. . |
| 5,701,302 | 12/1997 | Geiger . |
| 5,722,067 | 2/1998 | Fougnies et al. . |
| 5,754,954 | 5/1998 | Cannon et al. . |
| 5,781,612 | 7/1998 | Choi et al. . |
| 5,794,144 * | 8/1998 | Comer et al. ........................ 455/426 |
| 5,797,097 | 8/1998 | Roach, Jr. et al. . |
| 5,805,997 | 9/1998 | Farris . |
| 5,826,195 | 10/1998 | Westerlage et al. . |
| 5,845,203 * | 12/1998 | LaDue .................................. 455/414 |
| 5,873,043 | 2/1999 | Comer . |
| 5,924,026 * | 7/1999 | Krishnan .............................. 455/414 |
| 6,081,514 * | 6/2000 | Raith .................................... 370/321 |

\* cited by examiner

METHOD AND SYSTEM FOR EXPANDING THE DATA CAPACITY OF A CELLULAR NETWORK CONTROL CHANNEL

RELATED APPLICATION

This application is related to application Ser. No. 08/622,438, filed Mar. 25, 1996, and is related to application Ser. No. 08/212,039, filed Mar. 11, 1994, which issued as U.S. Pat. No. 5,546,444.

TECHNICAL FIELD

The present invention relates generally to communicating data via a cellular network control channel of a cellular mobile radiotelephone system and more particularly relates to expanding the effective data capacity of a cellular network control channel.

BACKGROUND OF THE INVENTION

The communications industry has developed and manufactured a number of communications devices and methods aimed at satisfying a large and ever-growing demand for communicating data. For industrial applications, a central data collection site may have a need for acquiring information from a variety of remotely located monitoring devices that collect data about the operation or performance of industrial equipment. Operators of a central control site also may have a need to cause a remotely located device to perform some operation. The communications systems and methods developed in this area by the communications industry are collectively referred to as telemetry.

Generally, telemetry is the technology of automatic data measurement and transmission, as by wire or radio, from remote devices, to a central station for recording and analysis. Telemetry can also involve communications in the opposite direction, i.e., from the central station to the remote devices. Data communication in both directions may be utilized to provide a closed loop control system. For example, the operator of an oil pipeline may control flow within the pipeline by controlling the opening of a valve in the pipeline. For the purposes of this discussion, data communication from the central station to the remote device is termed "forward communication"; data communication from the remote device to the central station is termed "reverse communication". In the oil pipeline example, a reverse communication could provide to the operator data on the flow of oil through the pipeline. A forward communication could transmit a signal from the operator to a valve to reduce the flow of oil, thereby completing the closed loop control system.

Wireless communications have been extensively used to support telemetry systems. A common form of wireless communication for both voice and data transmissions is the cellular mobile radiotelephone (CMR) system, which is connected to the extensive public switched telephone network (PSTN) and permits communications between a mobile radiotelephone user and anyone with a conventional telephone (or another radiotelephone). Typical CMR systems are characterized by dividing a radio coverage area into smaller coverage areas or "cells" using low power transmitters and coverage-restricted receivers. CMR systems typically include control channels for establishing communication between the CMR system and a radiotelephone and voice channels for providing real-time communications between a radiotelephone and another party. As shown in U.S. Pat. Nos. 3,906,166 and 4,268,722, the limited coverage area enables the radio channels used in one cell to be reused in another cell. As a cellular mobile radiotelephone within one cell moves across the boundary of the cell and into an adjacent cell, control circuitry associated with the cells detects that the signal strength of the radiotelephone in the just-entered cell is stronger, and communications with the radiotelephone are "handed-off" to the just-entered cell. Thus, a CMR system can supply two-way communications for an array of cells, thereby supplying communications for a much wider area than conventional two-way wireless communication systems.

Many of the telemetry systems that have been made available by the communications industry utilize existing CMR systems. The benefit of these telemetry systems is that they are operable within the architecture of the existing CMR systems and, therefore, are readily and inexpensively implemented. Unfortunately, many such telemetry systems utilize the voice channels of the radiotelephone system to transmit data-only communications. Conventional radiotelephones generally offer both voice and data communications capabilities and, accordingly, the radiotelephone service is generally supplied at a cost that is commensurate with the combined voice and data services. Nevertheless, this combination of both voice and data communications may exceed a user's requirement for communicating by only data. In addition, real-time voice or data communications is not always desirable by a user who wishes only to receive a message without having a current activity disturbed. As with other wireless communication systems, the frequency spectrum for the CMR system radio channels, particularly voice channels, is a limited resource.

U.S. Pat. No. 5,546,444, assigned to the assignee for the present application, describes a system for obtaining data and communicating data (rather than voices) over the control channels of a CMR system. Utilizing the control channels to communicate data conserves the valuable frequency spectrum allocated for the voice channels that support normal telephone conversations on the CMR system. Because the system can be implemented within the confines of the conventional CMR system, no significant modification is required to accommodate the ability to communicate data over the control channels.

An illustration of the use of a control channel to communicate data is provided by the oil pipeline example discussed above. By connecting a modified radiotelephone transceiver to a flow meter, data generated by the flow meter can be collected by a monitoring device and communicated by the transceiver, via the control channel, to a central data collection system. An interface between the monitor and the transceiver can convert the data to a format that is communicable by the transceiver. This combination of a transceiver, monitor, and interface operates as a data reporting device. The central data collection system can transmit a message (i.e., control message) via a forward control channel (FOCC), to the data reporting device in order to trigger a communication of the collected data. The data reporting device can respond by transmitting a message via a reverse control channel (RECC), to the central data collection system. Instead of sending the information normally used for registering the device's identity or originating a call request, however, the data reporting device can replace such information with the collected data for transmission via the control channel. Without establishing a voice channel connection, the collected data is, nonetheless, communicated to the central data collection system.

Reverse communications (via the RECC) of selected data, by a data reporting device, are referred to as data messages.

Forward communications (via the FOCC) are referred to as control messages. Control messages contain a mobile identification number (MIN) which identifies the cellular device to which the control message is directed. Typically, only cellular devices with a matching MIN stored in memory will respond to the control message. The most common type of control message is the page message, which notifies the cellular device of an incoming call. Other control messages instruct the cellular device to perform other communication functions, such as to display a message waiting indicator or to generate an autonomous registration.

A data reporting device can be programmed to respond to a control message, received from the data collection system, by performing operations other than simply sending a data message to the data collection system. By equipping the data reporting device with a control unit, rather than (or in addition to) a monitor, the data reporting device can be utilized to provide a means of remote control. Returning to the oil pipeline example, the data collection system may transmit a control message to the data reporting device to close the oil pipeline valve. In this simple case, the data reporting device is programmed to trigger the valve closing when the device receives the control message from the data collection system. A second data reporting device could be used to open the valve when the second data reporting device receives a control message. Thus, by "calling" the first data reporting device, the data collection system closes the valve and, by "calling" the second data reporting device, the data collection system opens the valve.

Depending on the amount of data that can be communicated over the control channel from the data collection system toward the data reporting device, the data reporting device can be programmed to perform a number of operations. For example, if the remote device is only capable of receiving a control message and no accompanying data, then the remote device can only respond with a single operation. If, on the other hand, accompanying data can be sent with the control message, then the accompanying data can define which operation from a list of available operations that the remote device should perform. Instead of having two data reporting devices as described above, the oil pipeline valve could be operated with only one data reporting device. When a control message is placed by the data collection system to this data reporting device, the data collection system could also transmit an operation identifier as accompanying data to indicate that the valve should open or close.

Current CMR system-based data message systems are unable to provide the forward direction data capacity necessary to trigger more than one responsive operation. Specifically, current systems are designed to transmit a control message to a data reporting device and the data reporting device is designed to be responsive to that control message with a single operation. In order to perform more than one operation at a single remote site, current systems require either more than one data reporting device to be located at the site or the utilization of data reporting device that is responsive to more than one MIN. Either method is limited in the number of operations that can be requested, therefore, there is a need to define more operations within the transmitted control messages. Data reporting devices are expensive and there is a need to minimize the number of data reporting devices that are required to perform a number of operations at a single remote site.

Accordingly, there is a need to overcome the limitations of the prior art by adapting an existing telecommunications network to communicate data and/or operation identifiers from a central control system to a data reporting device, thereby enabling a single data reporting device to perform a number of operations with a single control message. There is also a need to expand the data capacity of the existing telecommunications network, such that an operation identifier communicated from the central control system to the remote data reporting device can identify any one of a number of available operations for the remote data reporting device to perform. This new use of an existing communications system should have a minimum impact upon present communications carried by the system. The present invention adapts the existing architecture of a CMR system in an efficient and cost-effective manner to support data communications via the CMR system, including the collection and reporting of data recorded at remote sites as well as the multi-operation functionality of the remote devices at the remote sites.

SUMMARY OF THE INVENTION

Conventional cellular mobile radiotelephone (CMR) systems provide the communications architecture that can be used to implement a data message system. Because of the widespread utilization of CMR systems for radiotelephone communication, their use as the communications architecture supporting data message systems provides an inexpensive and ready-made alternative to the development and implementation of dedicated communications systems. Collected data in the form of data messages can be transmitted over control channels of a CMR system, thereby avoiding the use of valuable voice channels and minimizing interference with the CMR system's normal radiotelephone communications traffic. Specifically, data messages can be communicated over a reverse control channel (RECC) of the CMR system. The CMR system can also provide for the transmission of control messages to cellular devices over a forward control channel (FOCC). Control messages enable the data message system to cause a cellular device to perform an operation in response to the receipt of the control message.

The conventional CMR system utilizes a mobile switching center (MSC) that transmits data over the FOCC to cellular devices (e.g., radiotelephones) within the coverage areas of the CMR system. The MSC communicates data to cellular devices in a continuous multiplexed data stream that constitutes the FOCC. The data stream is monitored by cellular devices and the cellular devices respond to the data directed to the devices. The most common form of this data is the control message, which conforms to a standard data protocol, such that it is readable by all cellular devices conforming to the same protocol. The control message contains a data field that contains a Mobile Identification Number (MIN) identifying the cellular device to which the control message is directed. A cellular device that is identified by the MIN will respond to the control message, while those cellular devices that are monitoring the control channel but are not so identified will simply continue monitoring the control channel.

A data message system can have a data message gateway that functions as an interface between the MSC of the CMR system and the data message system's users. The data message gateway operates as if it were another component of the CMR system, such that the data message gateway's operation is not disruptive to the normal operations of the CMR system. The data message gateway is functionally connected to the MSC by a communications link. Users of the data message system can be data service providers. Data service providers can access the data message gateway, to obtain collected data or to request the transmission of control messages, via a second communications link connecting the data service provider to the data message gateway.

The most common form of control message is the page message, which indicates to a cellular device that an incoming call is being attempted. The page message as well as all other forms of control messages are identified by an Order Code data field, which indicates to the cellular device the type of control message. Another type of control message is the Message Waiting Indicator. When the CMR system has stored voice mail or other messages corresponding to a particular cellular device, the Message Waiting Indicator control message can be transmitted to the cellular device, thereby indicating the existence of stored messages. The Order Code data field will contain a control message identifier indicating that the control message is a Message Waiting Indicator control message. Another portion of the control message, the Message Waiting Count data field can contain the number of messages that are currently stored. Many cellular devices are equipped to indicate the presence of and/or number of stored messages.

A data message system uses data reporting devices to collect and report selected data to the data message gateway. The data reporting devices may also be equipped to receive control messages over the control channels of a CMR system. For example, a page message can be sent to a data reporting device. However, instead of performing a step to establish voice channel communications, as a conventional radiotelephone is programmed to do, the data reporting device may be programmed to be responsive to a control message to transmit a data message to the data collection system. Alternatively, the data reporting device may be programmed to perform some other task or series of tasks, in response to the receipt of the page message.

Unlike the page message type of control message, the Message Waiting Indicator control message contains a variable data field that can be adapted to convey variable data instead of the normal quantity of waiting messages. Therefore, the Message Waiting Indicator control message presents an un-utilized portion of the FOCC data stream that can be used to transmit data to data reporting devices. By utilizing the otherwise unused Message Waiting Indicator control message, the data carrying capacity of the control channels can be effectively increased.

The present invention provides a system and method for triggering a responsive action by a data reporting device. By expanding the effective data capacity of a CMR system's control channels, the present invention provides a means for effecting the performance of any one of a number of operations by a control unit functionally connected to the data reporting device. Because a data reporting device does not utilize the stored messaging functions of the CMR system, the Message Waiting Count data field is available for use for another application, namely, to store data defining an operation to be performed. Whereas the conventional data reporting device could be responsive to a control message to perform a single responsive operation per control message, the present invention enables the data reporting device to perform a particular responsive operation from a list of available operations. The Message Waiting Count data field can identify an operation and trigger the data reporting device to cause a control unit to perform the operation. The data stored within the Message Waiting Count is referred to as the operation identifier, which identifies an operation to be performed by the data reporting device.

The Message Waiting Count data field is enabled by a unique code contained in the Order Code data field within the control message. When the data reporting device receives the Message Waiting order code, it responds by extracting the operation identifier contained in the Message Waiting Count data field of the control message. The data reporting device is preprogrammed to determine the operation associated with the operation identifier, by means of a correlative process for correlating an operation identifier to a corresponding operation.

One correlative process is performed by utilizing a simple look-up table for associating an operation identifier to a particular operation. When a remote data reporting device receives a control message containing an operation identifier in the Message Waiting Count data field, the device extracts the operation identifier from the control message. The device then compares the extracted operation identifier to a look-up table and determines the operation that is associated with the operation identifier. The remote data reporting device can then cause an external device to perform the operation so defined.

In another aspect of the invention, the Message Waiting Count data field can also contain raw data for processing by the data reporting device. The raw data can define the operation to be performed as well as the operation parameters for performance. For example, the raw data may determine the number of degrees that an external valve should be opened or closed or a voltage level to be applied to perform the identified operation.

For cellular communications devices that are simultaneously responsive to more than one MIN, the number of operations can be greatly expanded. Each MIN, to which the cellular communications device is responsive, can have a corresponding correlative process for determining the desired operation. The potential number of operations that the cellular communications device can recognize is multiplied by the number of MINs to which the cellular communications device is responsive.

These and other objects, features, and advantages of the present invention may be more clearly understood and appreciated from a review of the following detailed description and by reference to the appended drawings and claims.

DETAILED DESCRIPTION

Figure 1:
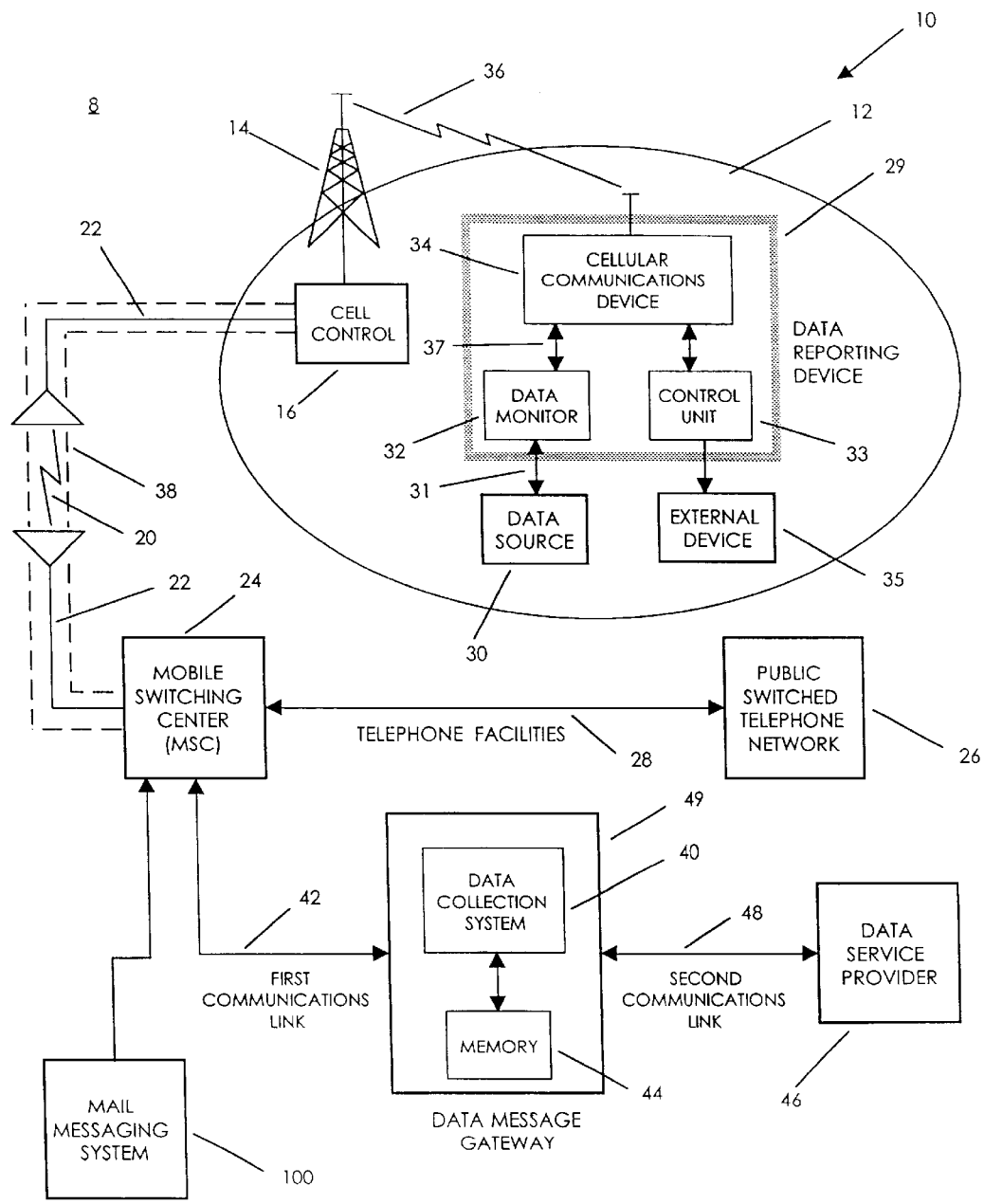
FIG. 1 is a block diagram of an exemplary embodiment of a data message system in the operating environment of a CMR system.

The present invention provides a data message system for communicating data collected from data reporting devices and for communicating operation identifiers from a mobile switching center (MSC) to data reporting devices. The data message system includes a set of data reporting devices, at least one MSC of a cellular mobile radiotelephone system (CMR) system, and a data collection system connected to the MSC. Each data reporting device can monitor the operation of the remote data source to obtain selected data. The data reporting device can transmit a data message containing the selected data to the MSC via a cellular network control channel of the CMR system. The MSC receives data messages from data reporting devices operating within coverage areas of the CMR system. The MSC can send the data messages to a data message gateway via a first communications link for processing of the information offered by the data messages. The data message gateway serves as an interface between the CMR system and the data message system. Each data reporting device can also cause a control unit to perform an operation, in response to the receipt of a control message containing an operation identifier from the MSC. If the external control unit is capable of more than one operation, then the data reporting device can specify a particular operation identified by the control message.

By operating within the environment of a CMR system, which is well adapted for portable or mobile communications, the present invention takes advantage of an existing wide area communications network and avoids the expense of communicating with each remote data site via a dedicated conventional telephone facility or conventional two-way radios. The data message system adapts the existing environment of a CMR system to communicate data from one or more remote sites to a central location and to communicate operation identifiers from a central location to one or more remote sites. However, to conserve the use of voice channels of the CMR system for conventional telephone conversations, the data collection system uses the cellular network control channel of the CMR system for data communications. This use of the cellular network control channels permits conservation of the valuable frequency spectrum dedicated to the voice channels of the typical CMR system.

In view of the foregoing, it will be understood that the present invention adapts the existing architecture and communications protocols for a conventional CMR system to supply a novel and economical approach to the communication of data collected from numerous remote sites and the communication of operation identifiers to control units at external sites. It will be further understood that the communication of data messages and operation identifiers between an MSC and the cellular communications device is primarily based upon conventional techniques and known protocols for CMR system communications. Accordingly, prior to describing the embodiments of the present invention, it will be useful to first review the primary components and operation of a typical CMR system.

A Cellular Mobile Radiotelephone System

A CMR system is generally characterized by dividing a radio coverage area into smaller coverage areas or "cells" using low power transmitters and coverage-restricted receivers. As will be known to those skilled in the art, the limited coverage area allows the radio channels used in one cell to be reused in another cell. As a mobile radiotelephone within one cell moves across the boundary of the cell and into an adjacent cell, control circuitry associated with the cells detects that the signal strength of the mobile radiotelephone in the just-entered cell is stronger, and communications with the mobile radiotelephone are "handed-off" to the just-entered cell.

A CMR system typically uses a pair of radio frequencies for each radio channel and each cell. Each cell typically includes at least one signaling channel, also referred to as a cellular network control channel, and several voice channels. The control channel is selected or dedicated to receive requests for service from mobiles and portables, to page selected mobiles or portables, and to instruct the mobiles or portables to tune to a predetermined voice channel where a conversation may take place. Accordingly, the control channel is normally responsible for receiving and transmitting data to control the communication actions of the mobile and portable radiotelephones.

The control channels normally comprise a forward control channel (FOCC) for communications from the MSC to a radiotelephone unit and a reverse control channel (RECC) for communications from a radiotelephone unit to the MSC. The FOCC supplies a multiplexed data stream of message data words, a busy idle signal, and busy idle bits. The busy idle bits are useful for supplying an indication to monitoring radiotelephones about the current status of the RECC. If the RECC is in use by a radiotelephone unit, then the RECC is considered to be busy and the busy idle bit is set to a binary one value. Alternatively, if the RECC is not in use, then the RECC is considered to be idle and the busy idle bit is set to binary zero value. Mobile radiotelephones monitor the busy idle bits transmitted by the FOCC and, if the busy idle bit is set to a binary one value, then the mobile radiotelephone delays transmission on the RECC until the busy idle bit is set to a binary zero value. Thus, a radiotelephone normally transmits on the control channel during the window of opportunity that is presented by a transition from the busy state to the idle state. A more detailed description of the FOCC's multiplexed data stream will be provided below in connection with FIG. 2.

The data message and radio channel specifications for U.S. cellular radiotelephone systems are set forth in Electronic Industries Association/Telecommunications Industry Association (EIA/TIA) Standard 553, implemented in accordance with 47 C.F.R. § 22, in the Report and Orders pertaining to Federal Communications Commission (FCC) Docket No. 79-318. Copies of the EIA/TIA-553 may be obtained from the Engineering Department of the Electronic Industries Association at 2001 Pennsylvania Avenue, N.W., Washington, D.C., USA 20006.

It is known that when a cellular mobile radiotelephone originates a call, it transmits at least one data message to the serving cell of the CMR system. This request for a cellular voice channel, commonly referred to as a call origination signal, is defined by EIA/TIA-553 and can be implemented as a message or signal having certain defined fields. For example, this call origination signal can contain data fields for the low order seven digits of the mobile radiotelephone's telephone number, known as the Mobile Identification Number (MIN), the unit's Station Class Mark (SCM), which identifies functional characteristics of the unit, and the Called Address (i.e., the dialed telephone number). Cellular system operators typically also require additional data words to be transmitted within a call origination signal, including the MIN2, which is the high order three digits of the cellular unit's telephone number, and the Electronic Serial Number (ESN).

The MIN is assigned to a particular radio telephone unit by the cellular service provider selected by the subscriber. The MIN typically contains information unique to the CMR system operator, for example, the first three digits of the MIN ("XXX") typically correspond to an area code, the next three digits ("XXX") typically correspond to a geographic location within the area code; and the final four digits ("XXXX") identify a particular piece of equipment.

Similarly, the ESN is unique to each mobile cellular radiotelephone unit, and comprises a format that allows differentiation as to manufacturer and, in some cases, the model number, date of manufacture, and the like.

The call origination signal is provided first to the serving cell of the CMR system, and then through a data link to a mobile telephone switching center, otherwise described as a mobile switching center (MSC). The MSC makes voice connections between mobile radiotelephones and other telecommunications networks. At the MSC, a determination is typically made whether the radiotelephone identified by the message is an authorized user or subscriber by looking up the unit's telephone number, serial number, and other information supplied by the message to see if there is an entry in the MSC's database corresponding to that particular telephone. An optional function of an MSC is to validate that the ESN and MIN received as part of a call origination signal are valid. If the MIN is valid and the radiotelephone is identified as a subscriber within the given cellular system, i.e., a "home" unit, the MSC compares the received ESN to a database entry to detect fraud. If these checks succeed, the cellular call is then allowed to proceed.

It is also well known that when a mobile radiotelephone first powers up or first enters a CMR system when already powered, the unit can identify itself as actively present within the system. The radiotelephone identifies itself or "registers" through a process known as Autonomous Registration by supplying a data packet of information similar to that of a call origination signal. The autonomous registration signal typically comprises data fields for at least a mobile telephone number, i.e., the MIN, and an ESN. Unlike the autonomous registration signal, the call origination signal typically includes a data field containing the digits of the called telephone number, and a flag within a data field to distinguish the call origination signal from an autonomous registration signal.

A Data Message System

Referring now to the drawings, in which like numerals indicate like elements throughout the various figures, FIG. 1 illustrates the preferred embodiment of a data message system 10 in the preferred environment of a CMR system 8. Referring to FIG. 1, the data message system 10 supports the collection and communication of data to a central data collection site by data reporting devices 29 associated with numerous data sources. The data message system 10 also supports the communication of operation identifiers from the MSC 24 to data reporting devices 29 associated with numerous external devices 35 at remote sites. An operation identifier may be used by a data reporting device 29 to cause an external device 35 to perform an operation defined by the operation identifier.

A typical CMR system includes a geographic radio service area, such as indicated by the cell 12, of which a plurality of cells are typically provided in a typical cellular service operator's system. The cell 12 is served by a broadcast antenna 14 to permit communications between cellular mobile radiotelephones operating within the cell 12 and a cell control 16. The mobile switching center (MSC) 24, can communicate with the cell 12 either by dedicated telephone facilities (not shown) or, more frequently, by a cell-to-mobile switching center data link 22 between the cell control 16 and the MSC 24. At least a portion of the data link 22 is typically supported by a wireless communications link, such as the microwave link 20, located between the cell 12 and the MSC 24.

It is well known to those skilled in the art that the conventional CMR system comprises at least one MSC 24 coupled to an appropriate array of more or less identically equipped cell sites 12. The MSC 24 normally couples telephone conversations involving mobile radiotelephones operating in the cell 12 to the public switched telephone network (PSTN) 26 through telephone facilities 28. Many MSCs 24 are also capable of conveying to subscribers messages and information pertaining to messages that have been stored by the CMR system and/or a corresponding mail messaging system 100. Messages can be stored in the mail messaging system 100 by calling subscribers when the called subscriber is unavailable or when the calling subscriber desires that the message be delivered at a later time. Many cellular radiotelephones are capable of indicating to the called subscriber that messages are stored (waiting), what kind message are stored, and how many messages are stored.

The data message system 10 includes a set of data reporting devices 29, each of which may include a data monitor 32 for collecting data from a remote data sources 30 and a cellular communications device 34 for communicating the collected data via a control channel of the CMR system to the MSC 24. The data monitor 32, which is connected to a corresponding remote data source 30 via a signal path 31, obtains and records selected data directed to the operation or performance characteristics of the data source 30. In turn, the cellular communications device 34, which is connected to the corresponding data monitor 32 via a signal path 37, prepares a data packet containing the selected data and transmits the packet as a data message. The selected data represents actual data acquired by the data monitor 32 in response to monitoring the operation or performance of the data source 30. Alternatively, the selected data can represent predetermined data or a preprogrammed message that is associated with the detection of a certain event by the data monitor 32 for the data source 30.

The MSC 24 receives the data message via a cellular network control channel 38 formed by the combination of the data link 22 and a cellular communications link 36 between the broadcast antenna 14 and the cellular communications device 34. This combination of communications links is collectively referred to as the control channel. It is well known that a cellular network control channel for a conventional CMR system comprises two radio channels that are commonly described as the FOCC and the RECC. The FOCC is used for communications from the MSC to a radiotelephone unit. In contrast, the RECC is used for communications from the radiotelephone to the MSC 24. The communications operations of the preferred embodiment also use this convention for communications between the MSC 24 and the cellular communications device 34. In particular, the control channel 38 comprises two separate data communications paths, an FOCC for communications initiated by the MSC 24 and an RECC for communications initiated by the cellular communications devices 34 (or mobile radiotelephones operating within the cell).

Accordingly, the cellular communications device 34 transmits data messages via the RECC, whereas the MSC 24 transmits control messages via the FOCC. Cellular devices, including cellular communications devices 34 are responsive to control messages. Control messages contain a MIN identifying the cellular device to which the control message is directed. Typically, only cellular devices with a matching MIN stored in memory will respond to the control message. The most common type of control message is the page message, which notifies the cellular device of an incoming call. Other control messages instruct the cellular device to perform other communication functions, such as to display a message waiting indicator or to generate an autonomous registration signal.

In this manner, the MSC 24 can receive data messages from each of the cellular communication devices 34 operating within the coverage areas of an array of cells for the CMR system. Although the data messages contain selected data rather than the parameters normally contained in an actual radiotelephone control information, the MSC 24 will operate upon the data messages as if they were transmitted by a conventional cellular radiotelephone unit operating within the coverage area of the CMR system because the data messages are formatted to appear as a conventional call origination signal generated by a radiotelephone unit.

The MSC 24, in response to a data message, can conduct one or more of the following operations: store the data message for processing at a later date, process the selected data supplied by the data message, or forward the data message to a data collection system 40 via a first communications link 42. The data collection system 40, which is preferably connected to a memory storage device 44, collects the selected data by storing the received data messages within the memory storage device 44. This combination of data collection system 40 and memory storage device 44 is commonly referred to as a data message gateway, and serves as an interface between the CMR system and the data message system 10. Similar to the MSC 24, the data collection system 40 also can process the selected data to obtain further information concerning the operation or performance of the data sources 30. Alternatively, the data collection system 40 can send the information of the data message to a data service provider 46 via a second communications link 48.

A data service provider 46 represents the typical user of a data message system and may be a data message service subscriber that has access to the data message system, via a communications link 48 with the data message gateway 49. Alternatively, the data service provider 46 may be a data storage system and/or control system that sells its data services to a number of subscribers. The primary function of the data service provider 46 is to serve as an interface between the data message gateway 49 and those subscribers desiring data collection or remote control functions. The data service provider 46 is typically remotely located from the data message gateway 49 and facilitates convenient processing of the selected data at a central site. The second communications link 48 is typically implemented by a conventional telephone facility, a dedicated data link, or by a wireless communications link. The data service provider 46 can initiate an operation request that ultimately results in the performance of an operation by a cellular communications device 34 or an external device 35.

The combination of the data collection system 40 and the memory storage device 44 is referred to as the data message gateway 49. The data message gateway 49 represents a theoretical dividing line between the CMR system and the data service provider 46. The data message gateway 49 can be functionally connected to the MSC 24 via an interface complying with the well known IS-41 standard for data communications. The data message gateway 49 appears to the MSC 24 as if the data message gateway 49 were another MSC.

As discussed above, the MSC 24 has the capability of transmitting control messages over the FOCC. The most common control message is the page message, which may include the MIN of a particular radiotelephone or other cellular device. When the page message is broadcast over the FOCC, all of the radiotelephones and other cellular devices monitoring the FOCC may examine the MIN contained therein and compare it to one or more MINs that the radiotelephone or cellular device has stored in its internal memory. In response to a determination that the MIN broadcast within the page message over the FOCC matches a MIN in memory, the cellular device can respond by acknowledging receipt of the page message, via the RECC, and by initiating operations to establish a voice channel connection to the MSC 24 for voice or data transmission thereon.

The FOCC also can be used to transmit control messages other than conventional page messages. Other types of control messages are differentiated from page messages by the Order Code data field that is contained within the structure of the control message and will be discussed in more detail in connection with FIG. 2.

The data reporting devices 29 may also include a control unit 33 for controlling an external device 35. An operation identifier can be sent within a control message from the MSC 24 over the FOCC to the cellular communications device 34. The operation identifier can be formatted as part of the control message. Thus, all of the cellular devices in the cell, for which the MIN included in the control message provides a match, can respond to the control message. However, instead of performing operations to establish a voice channel, the cellular communications device 34 can forward the operation identifier contained in the control message to the control unit 33. The control unit can correlate the operation identifier to a predetermined corresponding operation, and cause the external device 35 to perform the operation. Because numerous cellular communications devices 34 can have the same MIN, a single control message can cause numerous external devices 35 to perform the same or different operations. Alternatively, the data reporting device 29 may be equipped to perform the operation itself, without an external device 35.

The inventors contemplate the communication of operation identifiers to control units and external devices including oil pipeline valves, farm irrigation systems, and temperature control units. The use of operation identifiers, within a command message communicated over the FOCC, to expand the responsive actions of a data reporting device will reduce the number of expensive external devices needed to remotely operate such applications. In an exemplary embodiment, the data monitor 32, the control unit 33, and the cellular communications device 34 may be integrated into a single functional entity.

A typical application for the use of the data message system 10 for remote control operation is the control of an oil pipeline. An oil pipeline operator may need to turn pumps on or off and open or close valves to control the flow of oil within the pipeline. The oil flow can be monitored by connecting the data monitor 32 to a flow meter in the pipeline. The collected data can be used to compare the actual measured flow to certain predetermined flow thresholds. If the oil flow falls below a certain predefined flow threshold, then the cellular communications device 34 can send a data message containing selected data indicating the low flow level, via the RECC, to the MSC 24 for ultimate transmission to the data service provider 46. In response, the data service provider 46 can transmit an operation request to the data massage gateway 49.

The data message gateway 49 can prepare a data packet suitable for communication with the MSC 24 and can transmit an operation identifier to the MSC 24. The MSC 24, in turn, can transmit a control message with the operation identifier contained within data fields of the control message, to any number of cellular communications devices 34 on the pipeline. Receipt of a control message containing an operation identifier by a cellular communications device could, for example, cause certain pumps to increase motor speed by ten percent or cause certain valves to open, providing oil flow from other sources. Additionally, the operation identifier may define various operation parameters of the operation. For example, a portion of the operation identifier may define how many degrees the valve is to be opened or closed.

For this application, each external device 35 (pumps, valves) can be functionally connected to a control unit 33 and a cellular communications device 34. The cellular communications devices 34 can be responsive to one or more MINs broadcast by the MSC 24, in response to an operation request initiated by the data service provider 46 and received from the data message gateway 49, in the form of a control message. When a cellular communications device 34 responds to a control message, it may transfer the entire control message or a portion of the control message to the controller 74 or to the control unit 33 for analysis. The controller 74 or the control unit 33 can separate the operation identifier from the rest of the control message. Once the operation identifier has been determined, the control unit 33 can use a correlative process, such as a look-up table, to determine which operation corresponds to the operation identifier. The control unit 33 can then cause the external device 35 to perform the corresponding operation. Alternatively, the cellular communications device 34 can, itself, determine the operation identifier and transmit a signal causing the control unit and/or the external device to perform the operation.

Because the control units can have different correlative processes (e.g., different look-up tables), a single page message, matching the MINs of more than one cellular communications device 34, may cause different external devices 35 to perform different functions. For example, a single operation identifier, sent within a single control message could cause one pump to increase motor speed and another pump to decrease motor speed. Moreover, each MIN stored in the memory of the cellular communications device 34 may have a separate corresponding correlative process (e.g., look-up table) from all other stored MINs in the same cellular communications device's 34 memory. This significantly increases the remote control capabilities of the data message system 10, because the data reporting device 29 can cause the performance of X operations, where X is the number of MINs to which the cellular communications device 34 is responsive times the number of operation identifiers than can be formatted within the control message. If, for example, a particular cellular communications device 34 is responsive to ten MINs and each control message can accommodate 32 distinct operation identifiers, then the data reporting device 29 can cause the performance of 320 distinct operations.

It will be recognized that the data collection system 10 is useful for a wide variety of data collection and remote control functions and that the above-described examples are not intended to limit the scope of applications for the present invention. Moreover, although the data reporting unit 29 in FIG. 1 is depicted with both a data monitor 32 and a control unit 33, the data reporting unit may be equipped with only one of these devices.

The MSC 24 and the data collection system 40 are preferably compatible with the EIA/TIA Interim Standard 41 (IS-41 standard). The IS-41 standard defines a communications protocol for communications between two cellular systems. The IS-41 standard allows cellular calls to be handed-off between dissimilar cellular systems, not unlike the way that calls are handed-off between cells of a single CMR system. In addition, the IS-41 standard permits call deliveries and a communications exchange for verifying whether a cellular caller is a valid cellular service subscriber. In this manner, the MSC 24 hands-off or forwards the data message to the data collection system 40 via the first communications link 42, which is preferably implemented as an IS-41-compatible network. In response, the data collection system sends a user validation message via the link 42 to confirm that the source of the data message, specifically a cellular communications device 34, is a valid cellular source. The data collection system 40, therefore, appears to the MSC 24 as if it were another MSC.

It will be understood that a single cellular communications device 34 can be connected to multiple monitors 32 to permit the transmission of selected data collected from associated data sources 30 located at a central site. For example, a single cellular communications device 34 can be mounted at a central location within or along an office building and multiple monitors 32 can be distributed throughout the building to permit the acquisition of data from the associated data sources 30. Similarly, a single cellular communications device 34 can be connected to multiple control units 33 to permit the transmission of operation identifiers to multiple external devices 35.

The general details of the data message system are disclosed in U.S. Pat. No. 5,546,444 issued to Peter O. Roach, Jr., Edward I. Comer, Charles M. Link, II, and Maurice Laster and assigned to BellSouth Corporation. A further discussion of the data message format in which the call origination format is utilized is disclosed in a copending U.S. patent application of Edward I. Comer and Peter Roach, Jr., Ser. No. 08/622,438, filed Mar. 26, 1996, and assigned to BellSouth Corporation. Both are fully incorporated herein by reference.

The Forward Control Channel and the IS-54 Standard

In the CMR system 8 depicted in FIG. 1 and described above, the FOCC provides the means by which control messages are communicated to the cellular communications devices 34. More specifically, the FOCC communicates a multiplexed data stream of information that is broadcast by the MSC 24. Each cell can have a unique and ever-changing data stream disseminating information pertaining to the communication capabilities of the CMR system in the form of control messages.

The FOCC is a continuous wideband data stream transmitted by the MSC 24. In an exemplary CMR system, the data stream is transmitted at 10 kilobits per second and conforms to the EIA/TIA Interim Standard 54 (i.e., IS-54). Typically, cellular devices are even-trained or odd-trained. Even-trained cellular devices respond only to page messages or control messages having a least-significant bit that is a zero. Odd-trained cellular devices respond only to page messages or control messages having a least-significant bit that is a one. The FOCC data stream of the exemplary CMR system has three discrete information streams that are time-multiplexed together to form a single data stream. Page messages or control messages to even-trained cellular devices are sent on what is referred to as stream A. Page messages or control messages to odd-trained cellular devices are sent on what is referred to as stream B. A busy-idle data stream is also included in the FOCC and indicates the status of the RECC. When the RECC is busy, the bits in the busy-idle data stream are set to a binary zero value. When the RECC is idle, the bits in the busy-idle data stream are set to a binary one value.

Figure 2:
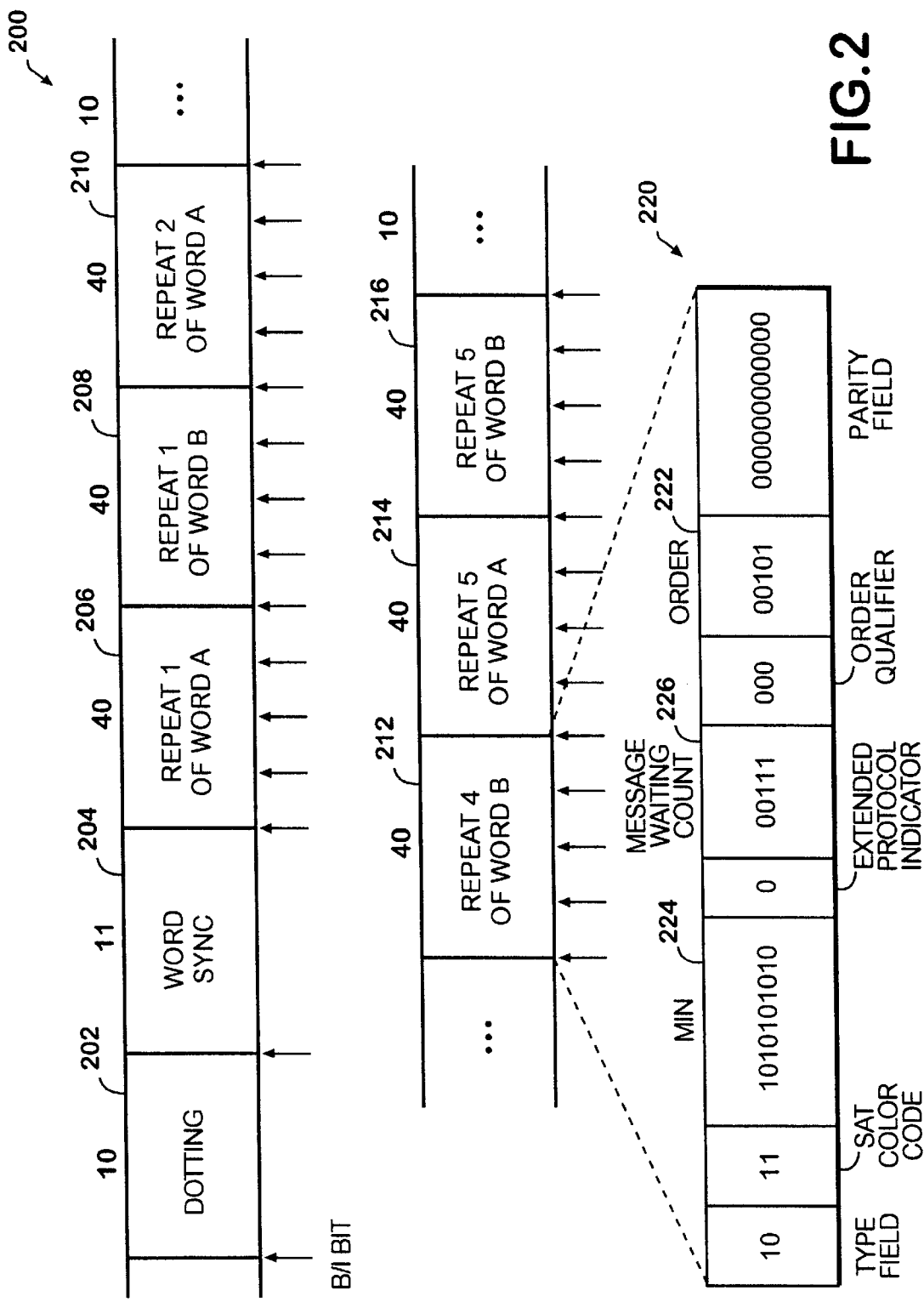
FIG. 2 is block diagram depicting the multiplexed arrangement of data communicated over an exemplary forward control channel and includes a table showing a typical format for a data message communicated via the data message system shown in FIG. 1.

FIG. 2 depicts excerpts of an exemplary IS-54 FOCC data stream 200, in which the stream A, stream B, and busy-idle data stream are multiplexed. The IS-54 communication standard defines the order and content of the data contained in the FOCC data stream. Stream A and stream B are transmitted in alternating 40-bit words, that are repeated five times. Referring now to FIG. 2, words 206, 210, and 214 are repeated, 40-bit words corresponding to stream A. Words 208, 212, and 216 are repeated, 40-bit words corresponding to stream B. The busy-idle bits are distributed throughout the FOCC data stream and are roughly located in the positions indicated by the arrows in FIG. 2.

A 10-bit dotting sequence 202 and an 11-bit word synch sequence 204 are transmitted periodically within the FOCC data stream 200, so that cellular devices monitoring the FOCC data stream 200 can achieve synchronization with the incoming data. By recognizing the standard patterns of the dotting sequence 202 (typically, 1010101010) and of the word synch sequence 204 (typically, 11100010010), the cellular devices can determine which part of the FOCC data stream 200 is being received at any given time. Each cellular device will respond to any page message or control message containing MIN fields matching a MIN stored in the cellular device's memory, as described in connection with FIG. 3.

Each control message transmitted in accordance to the IS-54 standard consists of one to five words. FIG. 2 depicts a table 220 breaking word 212 into the data fields making up the 40-bit word. As discussed above, the data stream contains a MIN data field 224 for indicating the cellular device to which the communication is directed. Another data field within word 212, conforming to the IS-54 standard, is designated for an Order Code 222. If the Order Code 222 is set to a zero value, then the data stream contains a page message. The presence of a non-zero Order Code 222 indicates that the data stream contains a control message rather than a page message. The data content of the Order Code 222 indicates the operation that the cellular device is expected to perform. The IS-54 standard defines an operation corresponding to each Order Code 222 defined by the IS-54 standard.

One such operation transmitted in the Order Code 222 data field is the Message Waiting Order (MWO). The MWO indicates that messages corresponding to a particular MIN are stored in the CMR system and/or in the mail messaging system. A cellular device having the particular MIN in its memory may respond to the receipt of an MWO by indicating to the subscriber that messages are stored for the subscriber. Depending on the capabilities of the cellular device, the presence of stored mail messages may be indicated to the subscriber in a number of ways, including an LED indicator and/or a message displayed on the cellular device's LCD screen. The radiotelephone subscriber may access such mail messages by calling a telephone number providing access to the mail messaging system.

The IS-54 standard also provides a data field in which the number of stored messages is made available to the subscriber's radiotelephone. For the purposes of this discussion, this data field is referred to as the Message Waiting Count 226. The number of messages stored for the subscriber is represented by a number transmitted in the Message Waiting Count 226 data field. Typically, the Message Waiting Count 226 data field is 5 bits long, thereby permitting the storage of binary values between 0 and 31 (in decimal). For cellular devices that are equipped to process this Message Waiting data, the number of messages may be displayed by the cellular device.

As discussed above in connection with FIG. 1, an exemplary CMR system supports communication between home and foreign MSCs that are providing communication support for a particular radiotelephone. The IS-41 standard discussed above provides the communications protocol between MSCs of data that characterizes the radiotelephone and the services within the home coverage area to which the particular subscriber has subscribed. If a subscriber has Message Waiting capabilities, then this information can be communicated from the subscriber's home CMR system to a foreign CMR system. The IS-41 standard utilizes two data fields, the Message Waiting Type and the Message Waiting Count fields to communicate the type and number of messages stored for a particular subscriber (i.e., MIN).

The Message Waiting Type permits the CMR system to specify whether the messages stored for the subscriber include voice messages, Short Messages Service (SMS) messages, or Fax (G3) messages. The Message Waiting Count permits the CMR system to specify the number of messages that are currently stored for a subscriber. Thus, the subscriber has access to the message waiting data regardless of whether the subscriber is within the coverage area of the home CMR system or a foreign CMR system.

As stated above, an exemplary embodiment of the data message system 10 (FIG. 1) does not utilize the Message Waiting function for use by the data reporting devices 29 (FIG. 1), because the data reporting devices 29 are incapable of accessing or processing stored messages. Consequently, the Message Waiting Count 226 data field that would otherwise be used by the IS-54 standard for Message Waiting functions, is available for communicating other information. Specifically, the FOCC can be utilized by the MSC 24 (FIG. 1) to transmit operation identifiers within the data fields otherwise reserved for the Message Waiting information.

Thus, an operation identifier can be transmitted over the FOCC within the data fields otherwise reserved for indicating the number of messages stored for a user. When a data reporting device 29 receives a control message containing the operation identifier, it can extract the operation identifier from the data stream and determine the operation defined by the operation identifier. Once the operation has been determined, the data reporting device 29 can perform the operation or cause an external device 35 to perform the operation. An exemplary method of utilizing the MWO data fields to expand the data capacity of the FOCC in order to accommodate the transmission of operation identifiers will be described in more detail in connection with FIGS. 4 and 5.

A Cellular Communications Device

Figure 3:
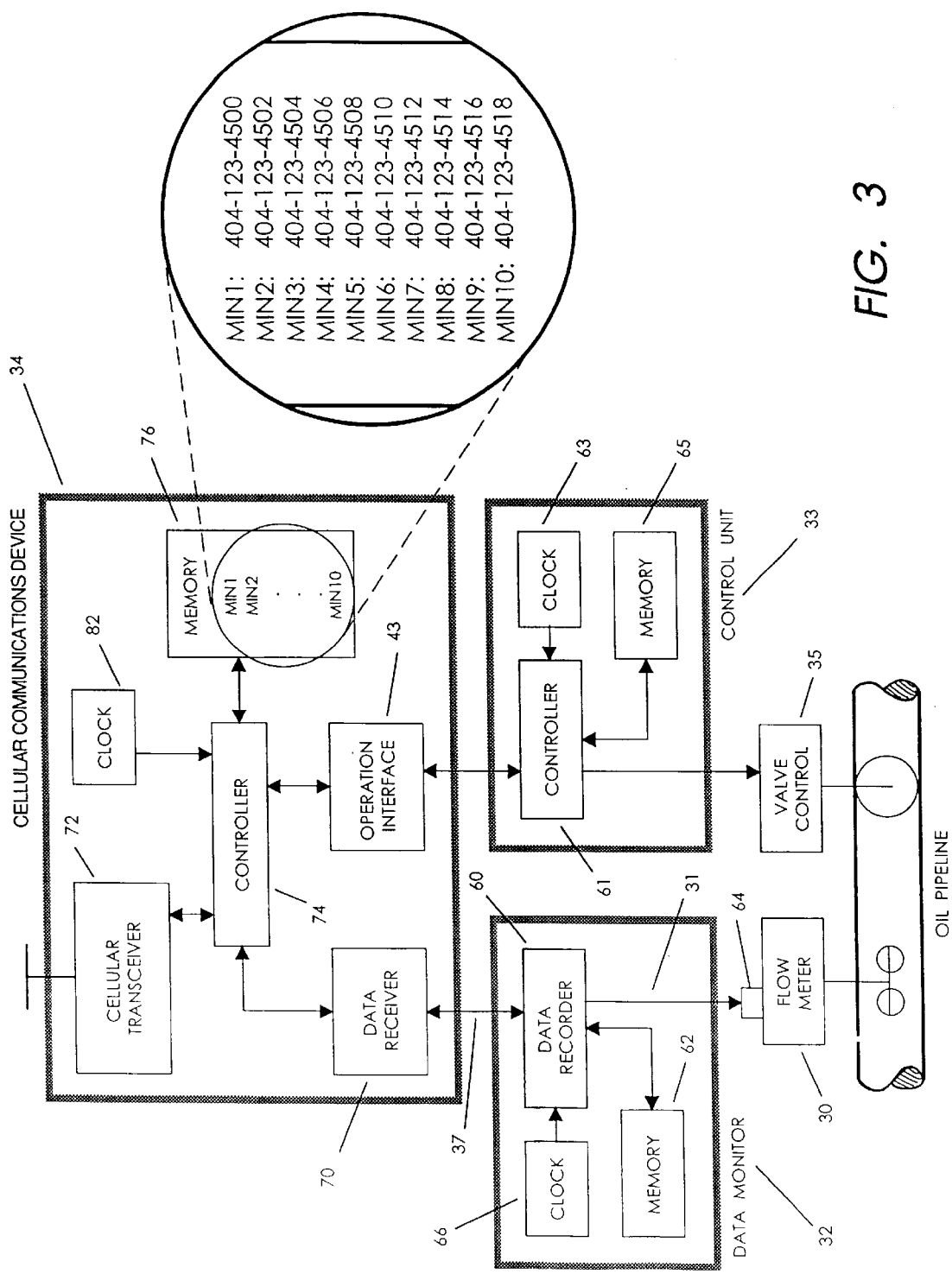
FIG. 3 is a block diagram of a data reporting device for an exemplary embodiment of a data message system.

FIG. 3 is a block diagram that illustrates the components of the data reporting device 29, namely the data monitor 32, the control unit 33, and the cellular communications device 34 in the operating environment of an oil pipeline application. Referring now to FIGS. 1 and 3, the data monitor 32 includes a data recorder 60, a memory 62, and one or more sensors 64. The data recorder 60, which is connected to the data source 30 via the signal path 31, uses the sensors 64 to detect certain operating or performance characteristics of the data source 30 (here, the flow meter). The detected characteristics represent selected data that are preferably stored within the memory storage device 62. The memory 62 is preferably random access memory (RAM). However, it will be understood that the memory 62 also can be implemented by other types of mass data storage devices, including a computer hard disk drive, an optical disk drive, or a compact disk (CD-ROM).

The cellular communications device 34 can include at least a data receiver 70, a cellular transceiver 72, and a controller 74. The data receiver 70, which is connected to the data recorder 60 via the signal path 37, receives the selected data obtained from the data source 30 by the data monitor 32. The controller 74, which is connected to the data receiver 70 and the cellular transceiver 72, controls the respective operations of the data receiver 70 and the cellular transceiver 72. The controller 74 is preferably a microprocessor-based control system that can be programmed to conduct control operations in a manner known to the art.

As discussed in connection with FIG. 2, the FOCC carries a stream of busy idle bits to indicate the status of the RECC of the cellular network control channel. The RECC is busy if the busy idle bit is set to a binary one value. To minimize the impact of transmissions by one or more cellular communications devices 34 within the cell 12 (FIG. 1) upon the normal control message traffic on the control channel 38, the cellular transceiver 72 preferably transmits a data message during those periods when the channel is available or is likely to be available.

It is well recognized that a cellular network control channel, such as the control channel 38, is a two-way communications path between the MSC 24 and the radio-telephone devices operating in the cell 12. Thus, the transceiver 72 is also useful for receiving communications from the MSC 24 via the FOCC of the control channel 38. In particular, the MSC 24 can output control messages via the control channel 38 to initiate certain operations or to control certain functions of one or more of the cellular communication devices 34 within the cell 12. The cellular communications device 34 is preferably programmed to respond to a control message by conducting a particular operation or by controlling a certain function associated with the control message.

The control messages typically include a MIN and each cellular communications device 34 only responds to a control message containing its predetermined MIN. This allows the MSC 24 to communicate with one or more of certain selected cellular communications devices 34. By proper use of the addressing operation, it is possible for the MSC 24 to remotely control the operations or functions of a subset of the cellular communications devices 34 that is selected from the overall group of devices 34 within the cell 12.

The memory storage device 76 may also contain a MIN to which the cellular communications device 34 will respond when a control message containing the MIN is received by the cellular transceiver 72. Preferably, a MIN will be stored in a non-volatile portion of the memory storage device 76. The MIN will typically include MIN and a MIN2 data, as discussed above. However, for the purposes of this discussion, both will be referred to collectively as a MIN. At least a portion of this MIN is assigned to a corresponding cellular communications device 34. The remaining portion (if available for use) of the 10-digit MIN can represent a command for a particular operation or function. In this manner, a cellular communications device 34 can be programmed to respond only to a control message containing its MIN and to conduct the particular operation or function identified by the address data.

By transmitting control messages to the cellular communications devices 34, the MSC 24 can cause the data reporting devices 29 to remotely control various operations of the external devices 35. In response to a selected control message, the cellular communications device 34 mimics the call origination operation of a conventional cellular radio-telephone unit by transmitting a data message formatted as a call origination signal or Autonomous Registration to the MSC 24. By use of this control message, a selected cellular communications device 34 can be polled at any time by the MSC 24 to initiate the transmission of a data message containing the desired selected data. Notably, a data reporting device 29 that is not equipped with a data monitor 32 and is utilized only for remote control operation, can be equipped with a cellular communications device 34 that only has a cellular receiver. A cellular transmitter is not, therefore, a necessary component for data reporting devices 29 that are not used for data collection.

As shown in the magnified portion of FIG. 3, the memory storage device 76 may include a number of MINs to which the cellular communications device 34 is responsive. A cellular communications device 34 may thereby be responsive to control messages containing any one of the MINs stored in the memory storage device 76. Advantageously, a cellular communications device 34 that is so equipped can also be equipped with a means of correlating a particular MIN to a particular operation. Therefore, when a control message containing a MIN is received, the cellular communications device 34 can correlate the received MIN to a particular operation and transmit the operation request to the control unit 33, through the operation interface 43.

Yet another alternative is to equip a cellular communications device 34 to respond to MINs matching a wildcard MIN. For example, one of the MINs stored in the memory storage device 76 can have one or more digits for which any digit will match (e.g., 404-123-45**). Thus, for a MIN with a single wildcard digit, control messages containing any one of ten possible MINs can cause the cellular communications device 34 to respond to the control message. This alternative has the potential to greatly increase the number of MINs to which the cellular communications device 34 is responsive.

The control unit 33 can include a controller 61, a clock 63, and a memory unit 65. The clock 63 can be used to time or limit the operation of the control unit 33. For example, the control unit 33 may be used to cause an external device 35 to perform a series of operations at particular time intervals. The memory device 65 can be used to provide the data needed to perform the function of correlating received pages with operations, described above. The controller 61 is preferably a microprocessor-based control system that can be programmed to conduct control operations in a manner known to the art.

In response to a control message received by the cellular transceiver 72 and having a MIN corresponding to a MIN stored in the memory storage device 76, the controller can cause the controller to perform an operation. If the cellular communications device 34 is merely responsive to a single MIN, the receipt of a control message will be sufficient to trigger a single operation by the external device 35. If the cellular communications device 34 is responsive to a number of received MINs, then the controller 74 can access another portion of the memory storage device 76 for correlative data. The correlative data can identify an operation that corresponds to the received MIN. Alternatively, the control unit's 33 controller 61 can provide the correlative means. In either case, the external device can be caused to perform as many different operations as MINs to which the cellular communications device 34 is responsive. As will be discussed in more detail, with regard to FIG. 4, the number of operations which the external device 35 can be made to perform can be expanded by utilizing an otherwise unused data field in the control message that includes an operation identifier.

When a control message is received by the cellular transceiver 72, via the FOCC, the transceiver 72 passes the received control message to the controller 74, whereupon a determination is made as to whether the MIN contained in the control message corresponds to any MIN in the memory storage device 76. If a MIN in the memory storage device 76 does match the MIN contained in the control message, then the controller examines the Order Code data field of the control message to determine the type of control message. As discussed above, if the control message is a page message, then the cellular communications device 34 may respond by transmitting a data message containing selected data to the MSC, via the RECC. Alternatively, the cellular communications device 34 may respond to the receipt of a page message by performing a series of operations, such as causing the control unit 33 to send a signal to an external device 35.

However, the cellular communications device 34 is not limited to a single responsive action, where the control message contains an operation identifier. In an exemplary embodiment of the present invention, the cellular communications device 34 is programmed to extract an operation identifier from the control message, when the cellular communications device 34 receives a Message Waiting Indicator control message.

When a Message Waiting Indicator control message is received, the controller 74 can examine the Order Code data field of the control message. In the IS-54 standard, a "00101" bit pattern in the Order Code data field will indicate that the control message is Message Waiting Indicator control message. The cellular communications device 34 can be programmed to respond to the receipt of a Message Waiting Indicator control message by extracting the data in the Message Waiting Count data field. Once the data has been extracted, the cellular communications device 34 can translate the data into an operation identifier.

In an exemplary embodiment of the present invention, the translation step may take the form of a correlative process, such as using a look-up table to correlate a Message Waiting Count bit pattern to a particular operation. Such a look-up table may be stored in a non-volatile portion of the memory storage device 76. Once the operation has been determined, the controller can send a signal, via an operation interface 43, to a control unit 33 or directly to an external device 35 for performance of the operation. As an alternative, the correlative process may be performed by the control unit 33, in which case, the cellular communications device 34 controller 74 would simply pass the Message Waiting Count data directly to the control unit 33. Another alternative is also available, in which the cellular communications device 34 performs the operation itself.

In the oil pipeline example depicted in FIG. 3, the combination of the cellular communications device 34, the data monitor 32, and the control unit 33, within the data reporting device 29 (FIG. 1), provides a means for closed-loop control of the oil flow in the pipeline. The actual flow can be measured by monitoring the data source 30. In this example, the data source 30 is a flow meter mounted in the pipeline. As described above, the cellular communications device 34 can prepare and transmit a data message that contains the selected data collected from the flow meter. When the flow data is received by the data collection system 40 (FIG. 1) or by the data service provider 46 (FIG. 1), the flow data can be compared to predefined levels.

If the oil flow is above or below a predefined level, an adjustment can be made by controlling the external device 35. In the oil pipeline example, the external device 35 is a valve controller. The data service provider 46 (FIG. 1) may prepare a data packet and transmit it to data message gateway 49 and the MSC 24, and ultimately the cellular communications device 34 as a control message, as described above. The cellular communications device 34 can respond to the data message by causing the control unit 33 to cause the external device 35 (i.e., the valve controller) to perform an operation. If the oil flow level is too high, the valve can be closed more and if the oil flow level is too low, the valve can be opened more. Once the adjustment is made, the flow data from the flow meter can be collected to verify that the adjustment has been effective, thereby providing closed-loop control. If the adjustment has not been effective, or has overcompensated for the previous, errant oil flow level, then a subsequent adjustment can be made by means of the valve controller.

Because the data monitor 32 and the control unit 33 are equipped with clocks 66, 63, the adjustments can be made at particular times or over time intervals. By providing an operation identifier to the control unit 33, the control unit 33 can cause the external device 35 to perform a particular operation, rather than the same operation each time. For example, the oil pipeline valve could be caused to open or close a particular number of degrees. One operation identifier may cause the valve to close 15°, while another operation identifier may cause the valve to close 25°. However, the conventional control message (conforming to the IS-54 communications standard) transmitted from a data collection system 40 (FIG. 1) and/or data service provider 46 (FIG. 1) does not have the data capacity for providing an operation identifier to the cellular communications device 34. A means for expanding the data capacity of the page messages and control messages transmitted via the FOCC will now be discussed.

Expanding the Data Capacity of the FOCC

Figure 4A:
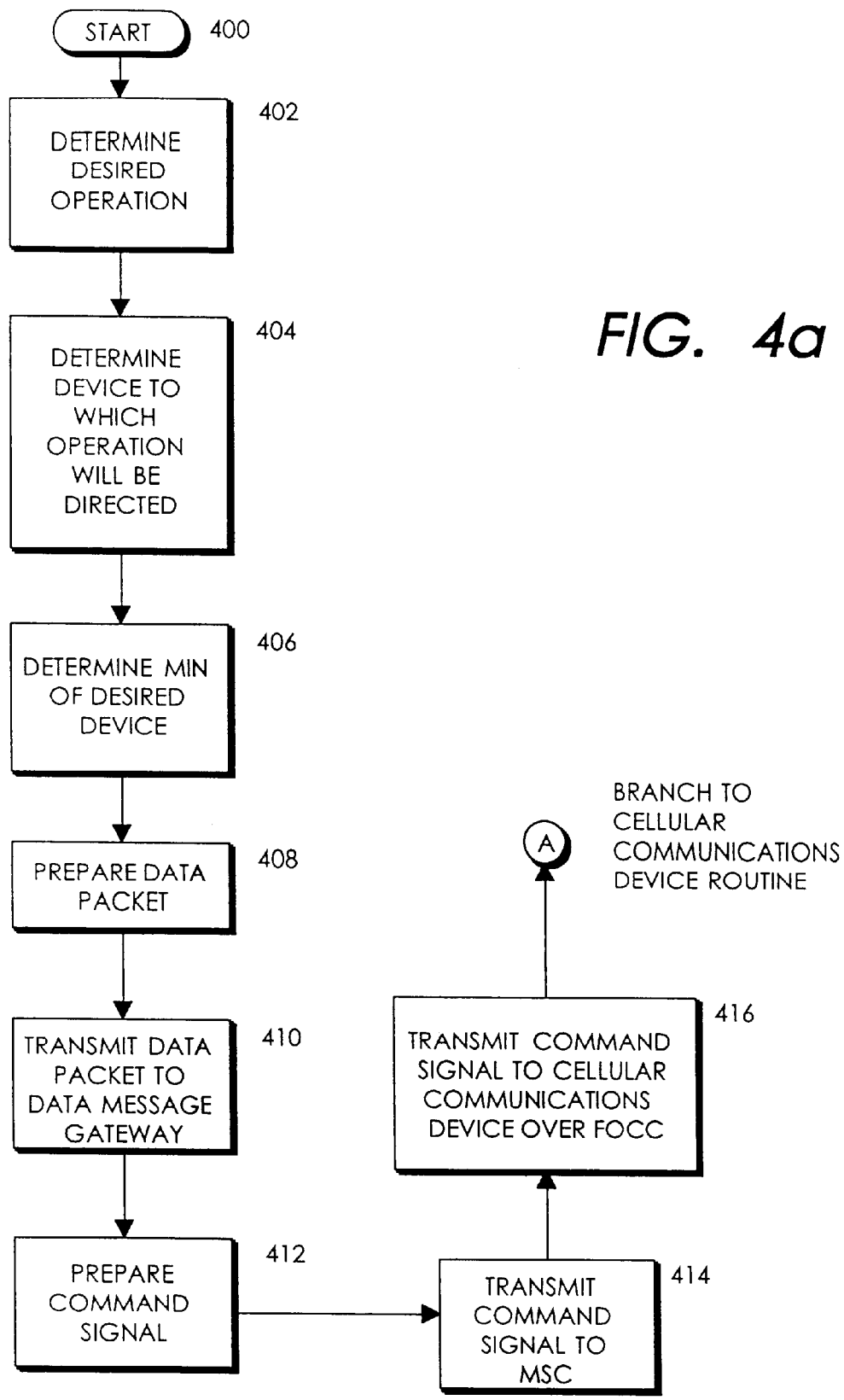
FIGS. 4a and 4b are flow chart diagrams that show the steps for a method of transmitting an operation identifier to a data reporting device by an exemplary embodiment of the data message system.
Figure 4B:
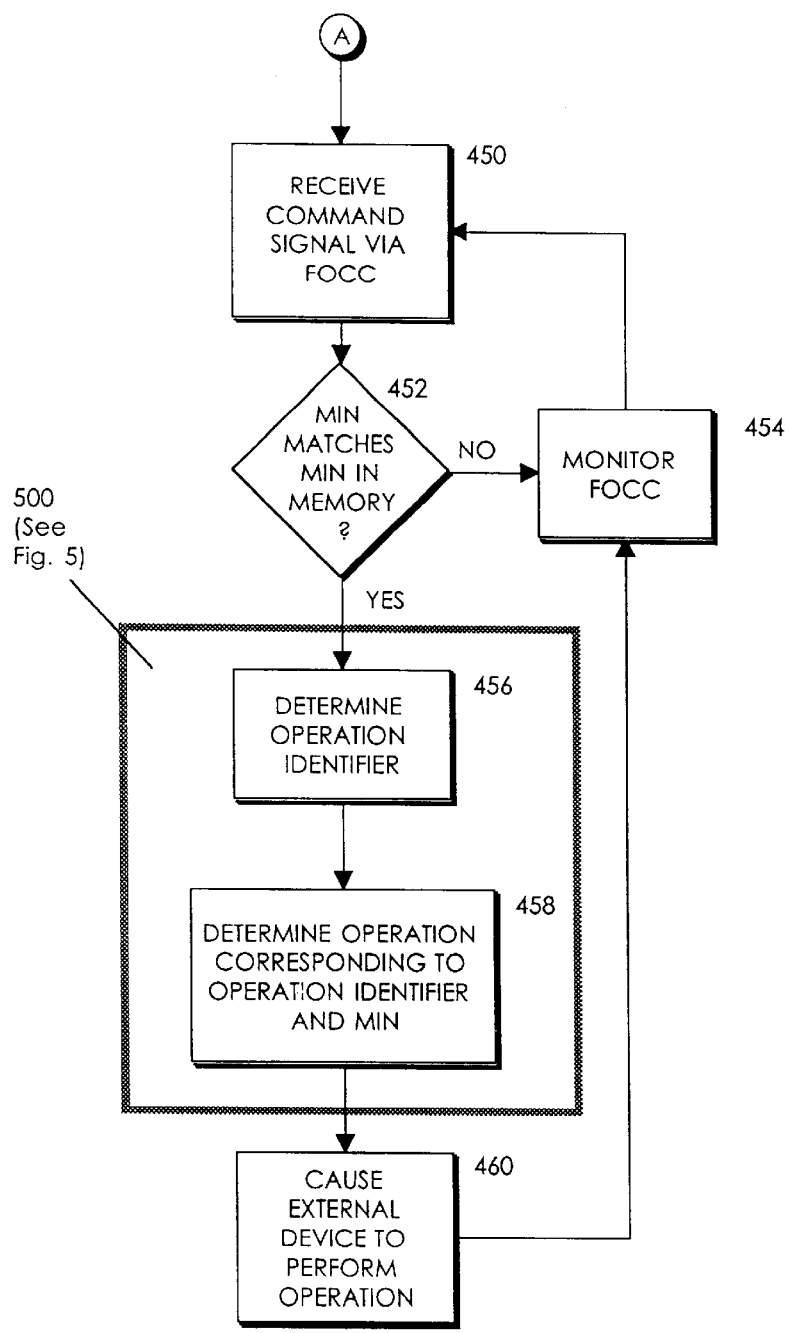

FIG. 4a illustrates a set of exemplary steps taken by the data service provider 46, in conjunction with the data message gateway 49 and the MSC 24 to transmit an operation identifier to the cellular communications device 34. FIG. 4b illustrates a set of exemplary steps taken by the cellular communications device 34 in response to the receipt of a control message containing an operation identifier from the MSC 24. Turning now to FIGS. 1 and 4a, the method starts at start block 400 and proceeds to step 402. At step 402, the data service provider 46 determines the desired operation. In the oil pipeline example above, the service provider may have previously received data indicating that the oil flow needs to be increased and may determine that a particular valve must be opened more to effect the increase. At step 404, the data service provider 46 determines which cellular communications device(s) 34 to which to direct the operation (e.g., which control unit is controlling the appropriate pump). At step 406, the data service provider 46 determines the MIN associated with the cellular communications device 34 to which the operation is to be directed. As described in connection with FIG. 3, each cellular communications device 34 may have a number of MINs to which it is responsive. Moreover, a number of cellular communications devices 34 may have identical MINs. Consequently, by selecting a single MIN, the data service provider 46 can transmit an operation request to a number of different cellular communications devices 34 or, by sending a number of MINs in sequence, can transmit a number of operation requests to the same cellular communications device 34, thereby causing the external device 35 (FIG. 3) to perform a series of operations.

Referring still to FIG. 4a, the method branches to step 408. At step 408, the data service provider 46 prepares a data packet, including the operation request and a predetermined identifying characteristic (i.e., the MIN) identifying the particular cellular communications device(s) 34 to which the operation identifier is to be directed. At step 410, the data packet is transmitted to the data message gateway 49 (FIG. 1). At step 412, the data message gateway 49 (FIG. 1) prepares a control message. The control message may include the MIN of the desired cellular communications device 34 and an operation identifier. The operation identifier is simply a translation of the operation request. For example, the operation request may need to be converted into binary for transmission within the data fields of a control message.

In an exemplary embodiment of the present invention, the operation identifier is transmitted within the data fields otherwise used for the Message Waiting Count. However, any unused data fields within the control message may be used to transmit the operation identifier. At step 414, the control message is transmitted from the data message gateway 49 (FIG. 1) to the MSC 24 (FIG. 1). The MSC 24 transmits the control message to the cellular communications device 34, via the FOCC in step 416. At this point, the method branches, via connector A, to the steps that are typically performed by the cellular communications device 34.

Referring now to FIG. 4b, the method branches to step 450. The cellular communications device 34 receives (via the FOCC) the control message containing the MIN and the operation identifier (within the Message Waiting Count data field), at step 450. At step 452, the cellular communications device 34 compares the MIN contained in the control message to the MIN or MINs contained in the cellular communications device's 34 memory 76. If the MINs do not match, then the method branches to step 454 and the cellular communications device 34 returns to monitoring the FOCC for a control message or page message. If the MINs match, then the method branches to step 456 and the cellular communications device 34 examines the received control message to determine the operation identifier contained therein.

Once the cellular communications device 34 has distinguished the operation identifier, the operation identifier is correlated to a corresponding operation, at step 458. As discussed above in connection with FIG. 1, the correlative process for matching operation identifiers to operations can be performed by the cellular communications device 34 or by the control unit 33. Of course, a different correlative process may exist for each MIN to which the cellular communications device 34 is responsive. That is, an identical operation identifier sent to the same cellular communications device 34, but contained in control messages with different MINs can identify different operations. Steps 456 and 458 will be discussed in more detail below, in connection with FIG. 5.

Once the desired operation has been identified, the method branches to step 460, and the control unit 35 causes the external device 35 to perform the desired operation. The method then branches back to normal operation: monitoring the FOCC, at step 454.

Figure 5:
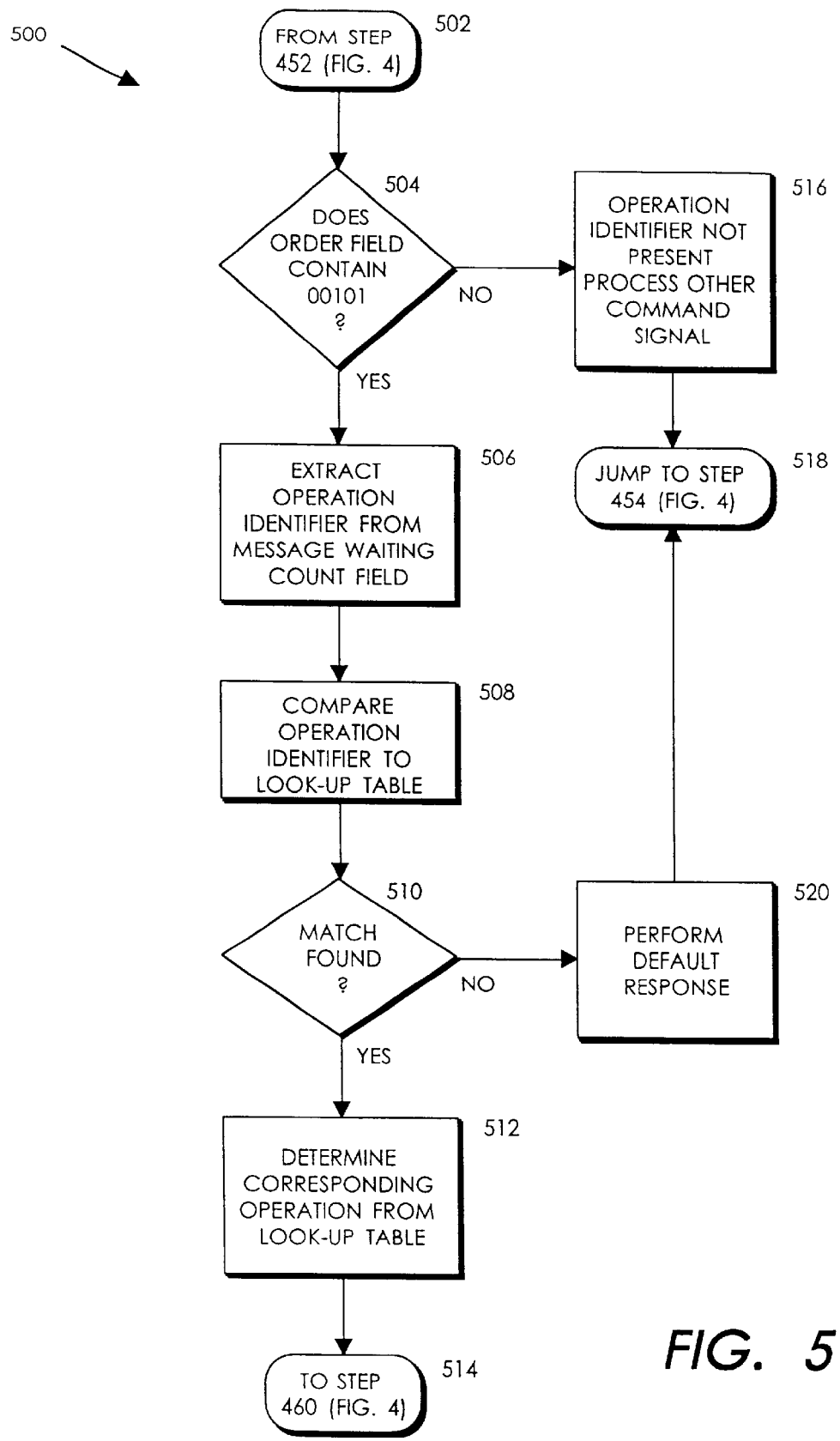
FIG. 5 is a flow chart diagram showing the steps of receiving and extracting an operation identifier from a control message.

FIG. 5 illustrates a set of exemplary steps taken by the cellular communications device 34 to determine the operation identifier and the corresponding operation defined therein. The method starts at step 502, which represents the place at which the method described in FIG. 4 would branch from step 452. The method then proceeds to step 504 at which a determination is made as to whether the order field within the received control message contains the "00101" string. This is the IS-54 standard's Order Code for indicating that the control message includes information pertaining to the Message Waiting System. Of course, in CMR systems conforming to other standards, the data string may be something different. If the determination is made that the Order Code field does not contain the appropriate string to invoke Message Waiting procedures, then the method branches to step 516. At step 516, the non-Message Waiting control message that has been received is processed. The method then branches back to normal operation: monitoring the FOCC, at step 454.

If, on the other hand, a determination is made at step 504 that the Message Waiting order is contained within the Order Code field, then the method branches to step 506. At step 506, the operation identifier is extracted from the Message Waiting Count 226 field. The method then proceeds to step 508, where the operation identifier is compared to a look-up table. Of course any means of correlating an operation identifier to a an operation is effective. A look-up table, however, is the simplest example. The method then determines whether a match for the operation identifier is found, at decision block 510. If a match is not found, a default response may be performed at step 520. Such a response may be to transmit an alarm message to the data collection system 40 indicating a failed remote control attempt. Alternatively, where the operation identifier contains raw data, the default operation may be to apply the raw data as an operation parameter of a predefined operation. Once the default response is performed, the method branches back to normal operation: monitoring the FOCC, at step 454.

If an operation identifier match is made at decision block 510, then the method branches to step 512. At step 512, the method determines, by means of the look-up table (or other correlative process), the operation associated with the operation identifier. The operation is, therefore, defined, and the external device and/or data reporting device 29 can perform the operation. In order to perform the operation, the method branches back to step 460.

Thus, the present invention provides a means for expanding the data carrying capacity of the FOCC, by utilizing data fields that would otherwise be unused in the conventional data message system. Specifically, by utilizing the data fields associated with the Message Waiting Order, the present invention provides a means for transmitting an operation identifier to a data reporting device. By incorporating a control unit into a data reporting device, an external device can be caused to perform the operation defined in the operation identifier. It will be appreciated that the operation identifier can also contain data defining an operation parameter of a particular identified operation, such as a voltage level. For cellular communications devices that are responsive to more than one MIN, the present invention greatly expands the range of operations that can be processed by a control unit. While the invention is described in terms of the IS-54 standard, it will be appreciated that the present invention can be utilized within the confines of any CMR system, regardless of the communications standard to which it adheres.

Advantageously, the present invention is operable within the confines of the conventional CMR system and the conventional data message system, because it utilized the existing architecture and communications protocol. Accordingly, operation identifiers may be sent to cellular communications devices from a data message service provider across the country, using the existing CMR systems therebetween. Because the conventional data message system does not utilize the message waiting system, the operation identifiers transmitted in the message waiting data fields will be simply ignored by data message systems that are incompatible with the transmission of operation identifiers.

It should be understood that the particular embodiments described herein have been disclosed by way of example and that other modifications may occur to those skilled in the art without departing from the scope and spirit of the appended claims.

I claim:

1. In or for a cellular mobile radiotelephone (CMR) system having an array of cells for communicating with cellular mobile radiotelephones within coverage areas of the array of cells, a data message system for communicating a control message, comprising:

a mobile switching center (MSC) for communicating the control message via a forward control channel of the CMR system, the control message comprising an operation identifier defining an operation selected from a plurality of operations wherein the operation identifier is positioned within a selected data field of the control message, the selected data field corresponding to a Message Waiting Count data field for maintaining a Message Waiting Count, the operation identifier corresponding to at least a portion of the Message Waiting Count; and a plurality of data reporting devices, each responsive to receiving the control message via the forward control channel and for performing the operation defined by the operation identifier, wherein the operation is one of the operations that can be performed by each of the data reporting devices.

2. The data message system of claim 1, wherein the control message is a Message Waiting Indicator control message and wherein the control message contains an Order Code data field operative to designate the control message as a Message Waiting Indicator control message.

3. The data message system of claim 1, further comprising a data message gateway for supplying the operation identifier to the MSC via a first communications link.

4. The data message system of claim 3, further comprising a data service provider functionally connected to the data message gateway, the data message gateway being further operative to receive an operation request from the data service provider, via a second communications link, to translate the operation request into the operation identifier, and to forward the operation identifier to the MSC, via the first communications link.

5. The data message system of claim 1, wherein the data reporting device is operative to perform a correlative process by matching the operation identifier to the operation.

6. The data message system of claim 5, wherein each data reporting device has a memory storage unit and is simultaneously responsive to a control message containing any one of a plurality of mobile identification numbers (MINs) stored in the memory unit.

7. The data message system of claim 6, wherein each data reporting device has a different correlative process for each MIN to which the data reporting device is responsive.

8. The data message system of claim 5, wherein the correlative process comprises matching the operation identifier to the operation by accessing a look-up table.

9. The data message system of claim 5, wherein the correlative process comprises extracting an operation parameter from the operation identifier.

10. The data message system of claim 1, further comprising at least one external device associated with each of the data reporting devices, the external device operative to perform the operation.

11. The data message system of claim 10, further comprising at least one control unit associated with each of the data reporting devices for performing a correlative process, matching the operation identifier to the operation.

12. In or for a cellular mobile radiotelephone (CMR) system having an array of cells for communicating with cellular mobile radiotelephones within coverage areas of the array of cells, a data message system for communicating an operation identifier defining an operation to be performed by a plurality of external devices, the data message system comprising:

a plurality of data reporting devices, each for receiving a control message via a forward control channel containing an operation identifier, and for forwarding the operation identifier to at least one of the external devices, thereby causing the external device to perform the operation;

a mobile switching center (MSC) for communicating the control message via the forward control channel of the CMR system, in response to receiving the operation identifier from a data message gateway, via a first communication link, the MSC operative to transmit the operation identifier within a Message Waiting Count field of the control message; and wherein the operation is one of a plurality of available operations that can be performed by each of the external devices.

13. The data message system of claim 12, wherein the CMR system has a mail messaging system and wherein the control message comprises a data field for a Message Waiting Count, the operation identifier corresponding to at least a portion of the Message Waiting Count data field.

14. The data message system of claim 12, wherein each data reporting device is responsive to a control message containing any one of a plurality of mobile identification numbers (MINs).

15. The data message system of claim 14, wherein the data reporting device is operative to perform a correlative process by matching the operation identifier to the operation.

16. The data message system of claim 14, wherein the data reporting device is operative to perform a correlative process by extracting an operation parameter from the operation identifier.

17. The data message of claim 16, wherein each MIN has a unique correlative process, and wherein the data reporting device will perform the unique correlative process corresponding to the MIN contained in the control message.

18. The data message system of claim 12, wherein the data reporting device comprises a cellular communications device and a control unit functionally connected between the cellular communications device and the external device, the control unit operative to convert the operation identifier received from the cellular communications device into a format suitable for processing by the external device.

19. The data message system of claim 18, wherein the control unit performs a correlative process by matching the operation identifier to the operation.

20. In or for a cellular mobile radiotelephone (CMR) system having an array of cells for communicating with cellular mobile radiotelephones within coverage areas of the array of cells, a mobile switching center (MSC) for communicating a control message via a forward control channel, and a plurality of data reporting devices for controlling a plurality of external devices, a method for communicating within the control message an operation identifier to be performed by an external device, the method comprising the steps of:

receiving an operation request from a data service provider;

translating the operation request into the operation identifier;

transmitting the operation identifier to the MSC;

converting the operation identifier into a format that is suitable for transmission to at least one of the data reporting devices, via the forward control channel;

transmitting the operation identifier to at least one of the data reporting devices via the forward control channel within a Message Waiting Count data field of the control message; and causing at least one of the external devices to perform the operation.

21. The method of claim 20, further comprising the step of:

examining an Order Code data field of the control message to determine whether the control message contains the operation identifier within the Message Waiting Count data field.

22. The method of claim 20, further comprising the step of:

extracting the operation identifier from the Message Waiting Count data field.

23. The method of claim 20, further comprising the step of:

extracting an operation parameter from the Message Waiting Count data field.

24. The method of claim 20, further comprising the step of:

performing a correlative process to match the operation identifier to the operation.

25. The method of claim 24, further comprising the step of:

accessing a look-up table to perform the correlative process.

26. The method of claim 24, wherein the data reporting devices are responsive to control messages containing any one of a plurality of mobile identification numbers (MIN), the method further comprising the step of:

performing a unique correlative process for each MIN to which the data reporting device is responsive.

27. The method of claim 24, further comprising the step of:

in response to a failure of the correlative process to match the operation identifier to the operation, performing a default response.

* * * * *